US006742477B1

(12) United States Patent
Marraudino

(10) Patent No.: US 6,742,477 B1
(45) Date of Patent: Jun. 1, 2004

(54) DECORATIVE BACKGROUND ASSEMBLY WITH ILLUSTRATED DISPLAY PANEL, FLUORESCENT LIGHT, AND MIRROR, FOR USE WITH AN AQUARIUM

(76) Inventor: Robert Marraudino, 8081 Holland Dr. Apt. 11F, Huntington Beach, CA (US) 92647

( * ) Notice: Subject to any disclaimer, the term of this patent is extended or adjusted under 35 U.S.C. 154(b) by 0 days.

(21) Appl. No.: 10/410,048

(22) Filed: Apr. 9, 2003

(51) Int. Cl.⁷ ............................................. A01K 63/06
(52) U.S. Cl. ..................................... 119/256; 119/267
(58) Field of Search ............................... 119/256, 257, 119/258, 267

(56) References Cited

U.S. PATENT DOCUMENTS

| | | | | |
|---|---|---|---|---|
| 2,814,895 A | * | 12/1957 | Flam | 40/538 |
| 3,874,336 A | * | 4/1975 | Murphy | 119/257 |
| 4,353,327 A | * | 10/1982 | Shroyer | 119/257 |
| 5,090,358 A | * | 2/1992 | Waldman | 119/257 |
| 5,649,757 A | * | 7/1997 | Aleman et al. | 362/101 |
| 6,422,175 B1 | * | 7/2002 | Rudolph | 119/256 |

* cited by examiner

Primary Examiner—Robert P. Swiatek
(74) Attorney, Agent, or Firm—Goldstein Law Offices, P.C.

(57) ABSTRACT

A decorative background assembly for an aquarium, having a plurality of interchangeable illustrated display panels, for enhancing the appearance of the aquarium. The assembly has a waterproof housing which encloses a frame which selectively holds one of the display panels. The housing also encloses a fluorescent light fixture and an angled mirror in proximity to the light fixture. The housing has hooks for selective attachment of the decorative background assembly to the rear wall of the aquarium. The fluorescent light fixture and the mirror are mounted in proximity to the lower portion of the housing. In use, a user chooses one of the illustrated display panels for insertion into the frame. The user then selectively attaches the decorative background assembly to the rear wall of the aquarium by fitting the hooks over the rear wall of the aquarium. The fluorescent light is then illuminated, thereby illuminating the display panel with light reflected by the angled mirror.

9 Claims, 5 Drawing Sheets

DECORATIVE BACKGROUND ASSEMBLY WITH ILLUSTRATED DISPLAY PANEL, FLUORESCENT LIGHT, AND MIRROR, FOR USE WITH AN AQUARIUM

BACKGROUND OF THE INVENTION

1. Field of the Invention

The invention relates to a decorative background assembly having an illustrated display panel, a fluorescent light, and an angled mirror, for use with an aquarium.

2. Description of the Related Art

Millions of Americans keep fish as pets in aquariums. Of great concern to most aquarium owners is the appearance of the aquarium itself, which complements and adds to the visual display offered by the fish within the aquarium.

A variety of aquarium accessories with mirrors are available for enhancing the appearance of an aquarium. U.S. Pat. No. 3,706,299 to Hendges appears to show an aquarium having mirrors and a concealed light positioned at the top, which gives the appearance of a larger number of fish. Additionally, U.S. Pat. No. 3,119,371 to Zuckerman appears to show a combination aquarium and mirror, wherein the mirror has a printed image. Similarly, U.S. Pat. No. 3,808,024 to Glidden appears to show an aquarium having a plurality of mirrors for providing an illusion to the observer of a larger number of fish.

None of these devices, however, appears to show a a decorative background assembly having an illustrated display panel, a fluorescent light, and an angled mirror, for use with an aquarium. While these units may be suitable for the particular purpose employed, or for general use, they would not be as suitable for the purposes of the present invention as disclosed hereafter.

SUMMARY OF THE INVENTION

It is an object of the invention to produce a decorative background assembly which enhances the appearance of the aquarium. Accordingly, the assembly has an illustrated display panel which is positioned behind the rear wall of the aquarium where it may be easily seen by an observer looking through the front wall of the aquarium, thereby greatly enhancing the appearance of the aquarium.

It is another object of the invention to produce a decorative background assembly which is easily seen. Accordingly, the assembly has a bottom-mounted fluorescent light fixture and an angled mirror for reflection of fluorescent light onto the illustrated display panel, thereby allowing the display panel to be easily seen.

It is a further object of the invention to provide a decorative background assembly which will not be damaged by splashing water. Accordingly, the components of the assembly are water resistant, and are not damaged by splashing water from the aquarium.

It is yet another object of the invention to produce a decorative background assembly which may be used with an existing aquarium. Accordingly, the assembly has hooks which may be placed over the top portion of the rear wall of the aquarium, thereby allowing attachment of the assembly to an existing aquarium.

It is still yet another object of the invention to produce a decorative background assembly which may be easily removed from an aquarium when the aquarium needs to be cleaned. Accordingly, the assembly is easily removed by lifting the assembly upwards, thereby disengaging the hooks from the top portion of the rear wall of the aquarium.

It is an additional object of the invention to produce a decorative background assembly which is not unduly expensive. Accordingly, the assembly is constructed from inexpensive components and its cost is not prohibitive.

It is a further object of the invention to produce a decorative background assembly for an aquarium which provides a variety of pleasant background scenes. Accordingly, a variety of illustrated display panels are provided with the assembly, and a user may interchange these panels, to provide a variety of pleasant background scenes.

It is another object of the invention to produce a decorative background assembly for an aquarium which may be used with aquariums having a variety of sizes. Accordingly, the assembly is provided in a variety of sizes, thereby allowing use with aquariums of different sizes.

The invention is a decorative background assembly for an aquarium, having a plurality of interchangeable illustrated display panels, for enhancing the appearance of the aquarium. The assembly has a waterproof housing which encloses a frame which is not damaged by water and which selectively holds one of the display panels. The housing also encloses a fluorescent light fixture and an angled mirror in proximity to the light fixture. The housing has hooks for selective attachment of the decorative background assembly to the rear wall of the aquarium. The fluorescent light fixture and the mirror are mounted in proximity to the lower portion of the housing. In use, a user chooses one of the illustrated display panels for insertion into the frame. The user then selectively attaches the decorative background assembly to the rear wall of the aquarium by fitting the hooks over the rear wall of the aquarium. The fluorescent light is then illuminated, thereby illuminating the display panel with light reflected by the angled mirror.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
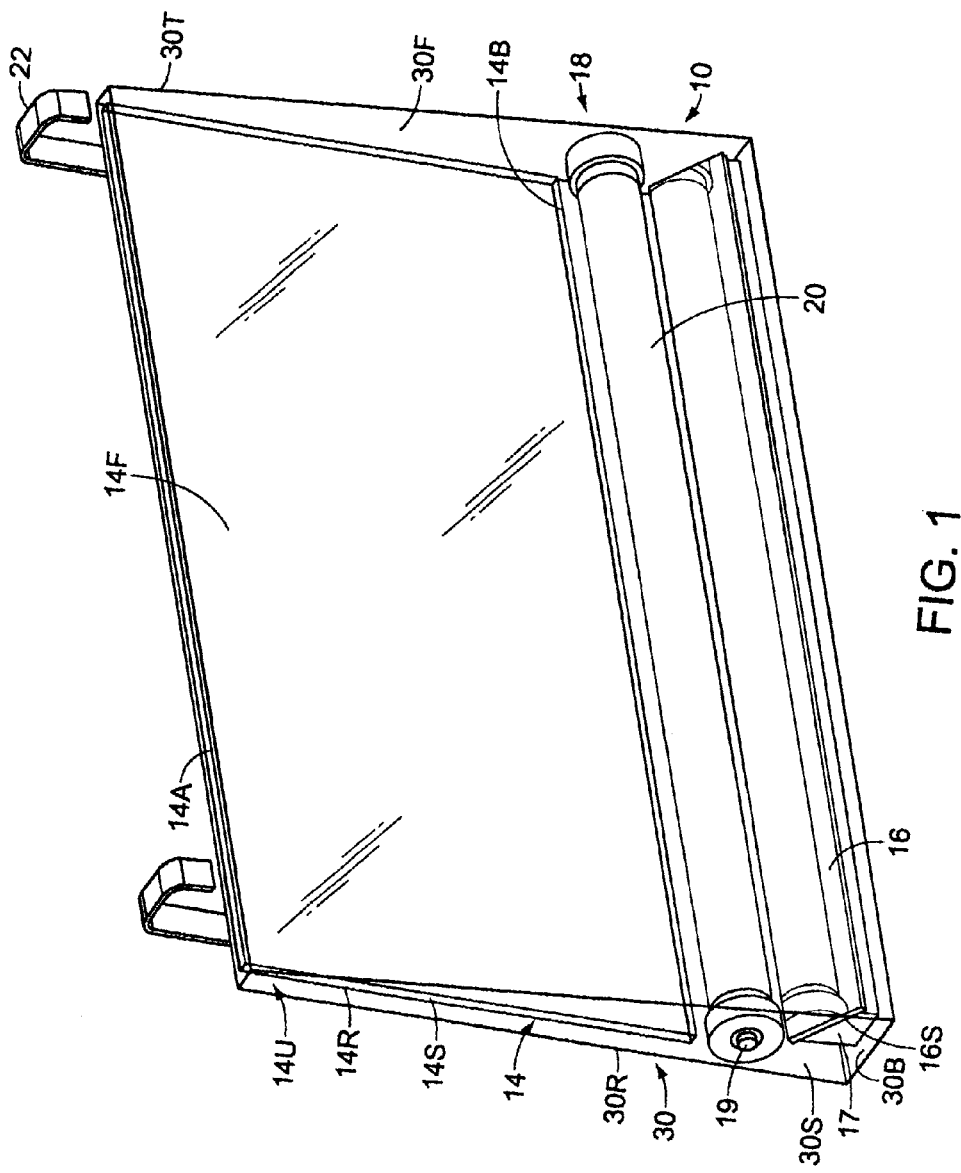
FIG. 1 is a perspective view of the decorative background assembly.
Figure 2:
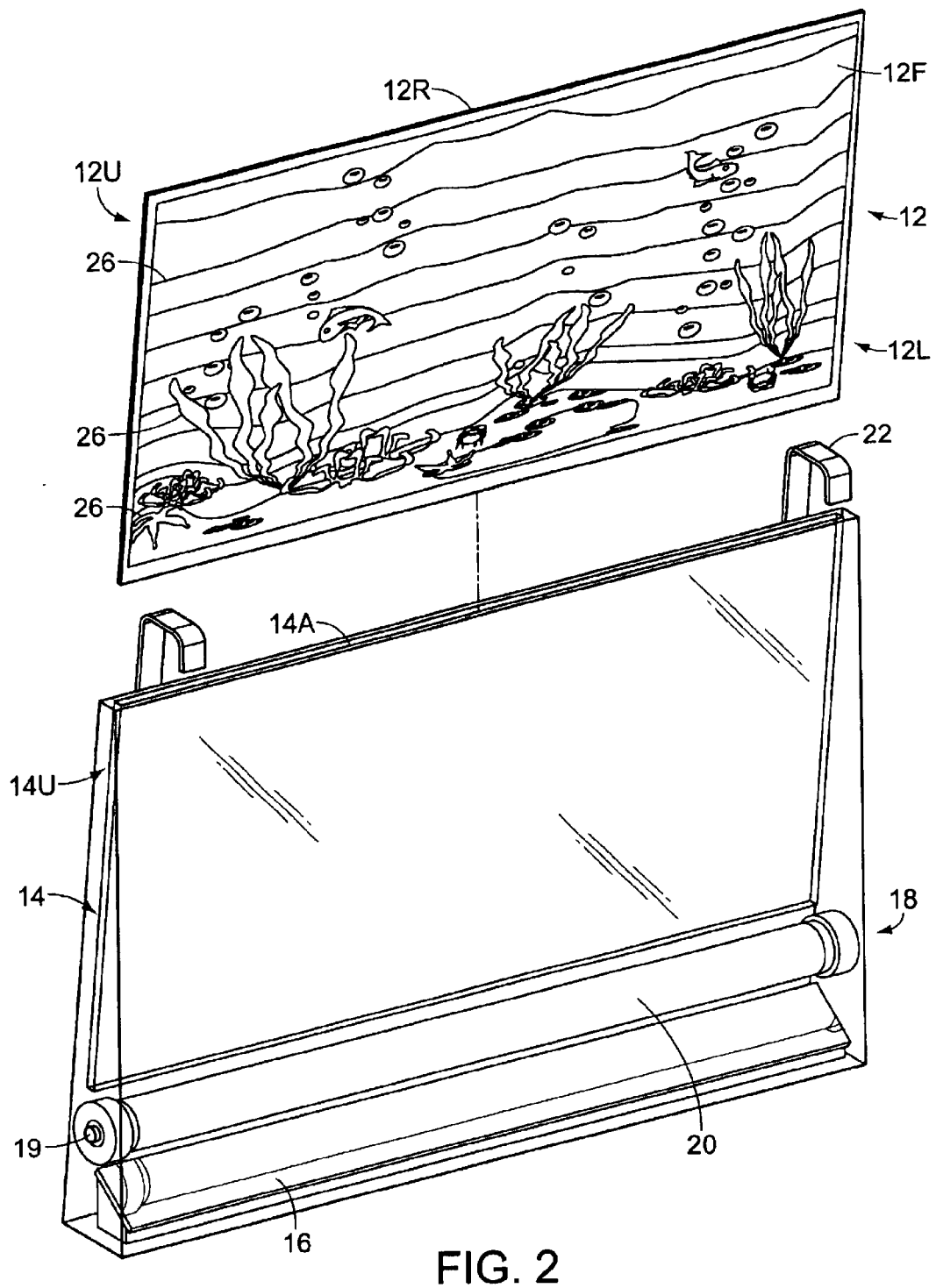
FIG. 2 is a perspective view of the decorative background assembly wherein a display panel is positioned for insertion within the frame.

FIG. 1 is a perspective view illustrating the decorative background assembly 10, which is substantially enclosed by a housing 30 having a front wall 30F, a rear wall 30R, a housing base 30B, a top portion 30T, and two substantially triangular housing sides 30S. The housing 30 encloses a substantially rectangular frame 14, a fluorescent light fixture 18, and an angled mirror 16. The housing 30 of the decorative background assembly 10 is waterproof, thereby preventing damage to the components contained within the housing 30. The components contained within the housing 30 are water resistant, and are not damaged by splashing water. The frame 14 has two side borders 14S, a lower border 14B, an upper portion 14U, and an opening 14A in proximity to the upper portion 14U. Turning momentarily to FIG. 2, the decorative background assembly 10 further comprises a plurality of illustrated display panels 12, each of which may be selectively inserted within the opening 14A in proximity to the upper portion 14U of the frame 14. Turning again to FIG. 1, the fluorescent light fixture 18 is mounted in proximity to the housing base 30B, and is holding a substantially cylindrical fluorescent light bulb 20. The fixture 18 has a push-button switch 19 for selective illumination of the light bulb 20. The angled mirror 16 is mounted below the fluorescent light fixture 18 and is supported by a mirror base 17. The assembly 10 has two hooks 22 in proximity to the top portion 30T of the housing 30, for selective attachment to an aquarium, as will be described hereinafter.

Figure 3:
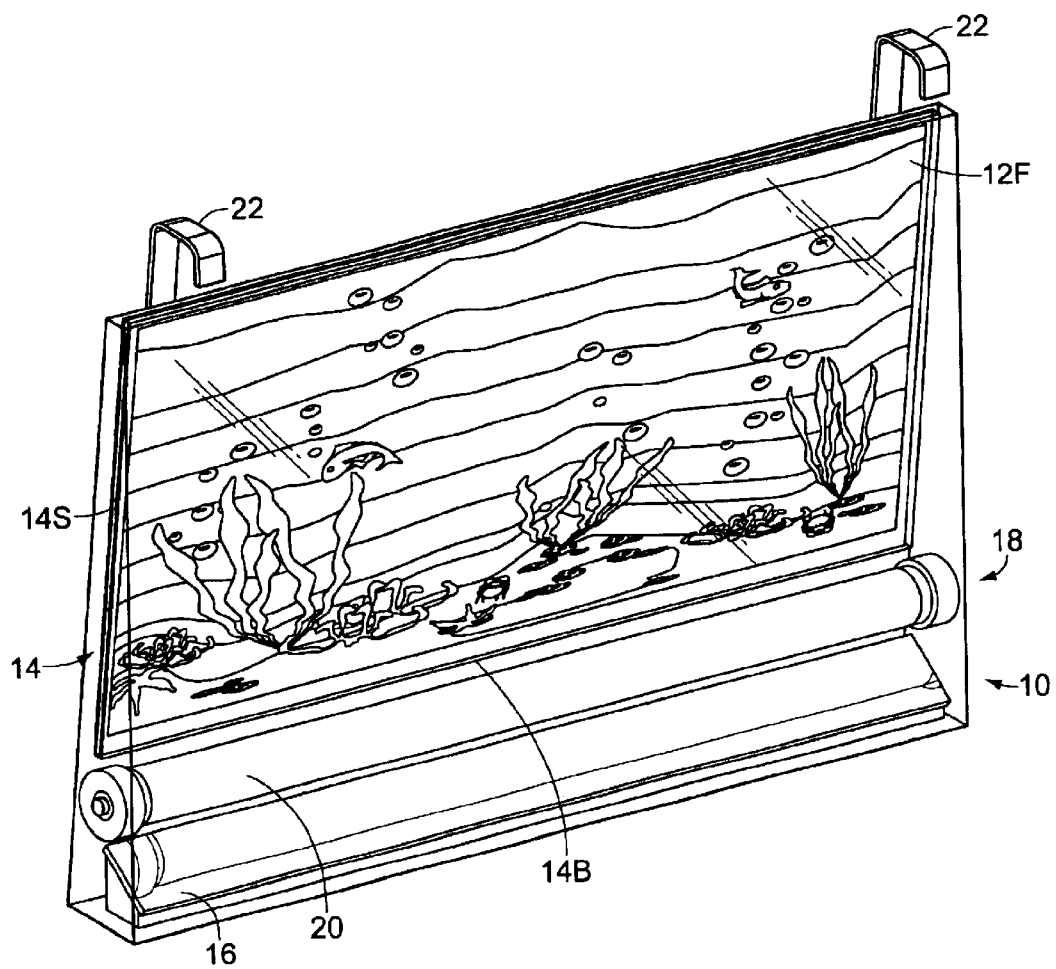
FIG. 3 is a perspective view of the decorative background assembly after a display panel has been positioned within the frame.

FIG. 2 illustrates one of the display panels 12 being positioned for insertion within the frame 14. The display panel 12 has a front surface 12F, a rear surface 12R, a lower portion 12L, an upper portion 12U, and a background illustration 26 on its front surface 12F. The lower portion 12L of the display panel 12 is being extended within the opening 14A in proximity to the upper portion 14U of the frame 14. FIG. 3 illustrates the assembly 10 after the display panel 12 has been fully extended within the frame 14. Here, the display panel 12 has been fully positioned within the two side borders 14S of the frame 14 and is supported by the lower border 14B of the frame 14. A plurality of interchangeable decorative display panels, each having a different pleasing image on the front surface, are provided with the decorative background assembly, in order that a user may vary the appearance of the assembly.

Figure 4:
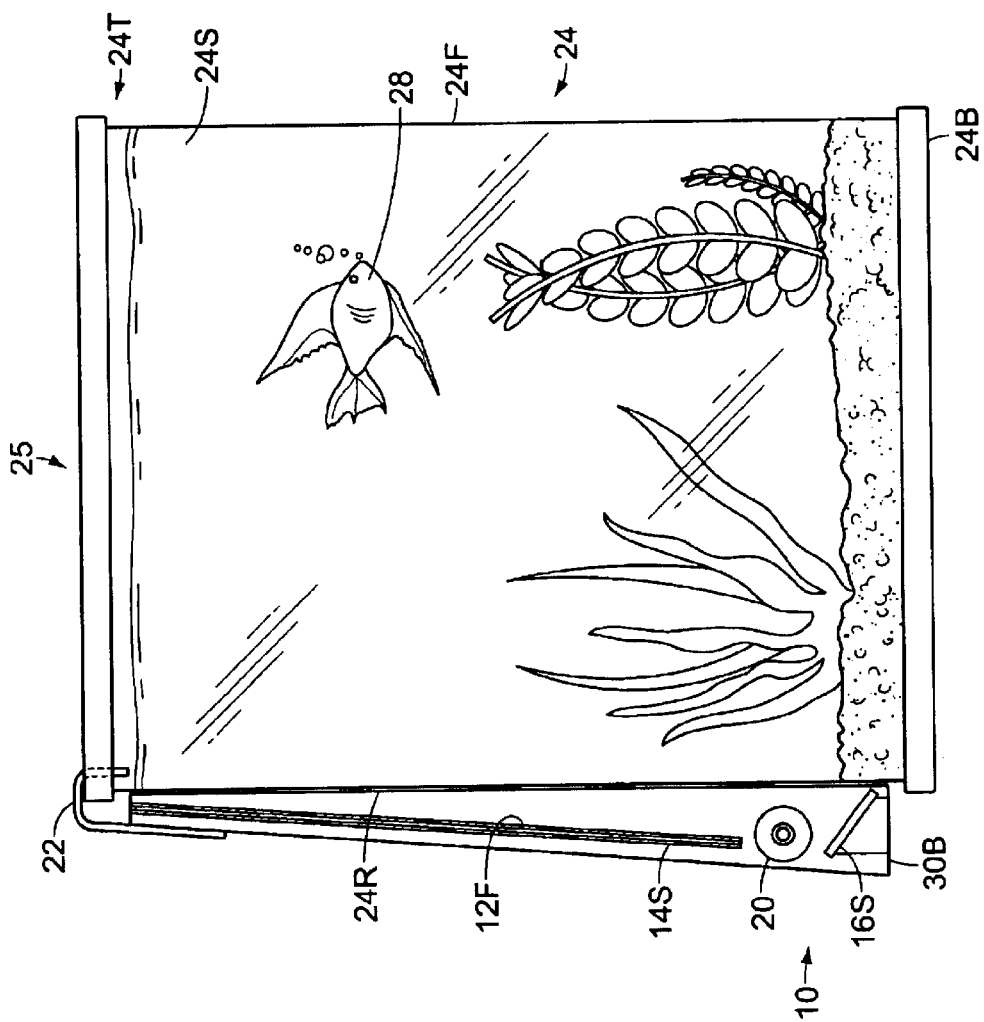
FIG. 4 is a side view of the decorative background assembly after it has been attached to the rear wall of the aquarium.

FIG. 4 illustrates a side view of the decorative background assembly 10 after attachment to an aquarium 24. The aquarium 24 is substantially rectangular and has two side walls 24S, a bottom surface 24B, a front wall 24F, and a rear wall 24R. The background assembly 10 is positioned behind the rear wall 24R of the aquarium 24, with the front surface 12F of the display panel 12 oriented towards the front wall 24R of the aquarium 24. The front wall 24F and the rear wall 24R of the aquarium 24 are transparent, thereby allowing an unobstructed view of the background illustrations 26 upon the front surface 12F of the display panel 12. The aquarium 24 has a top portion 24T, and an opening 25 located in proximity to the top portion 24T. The assembly 10 has been attached to the aquarium 24 by the hooks 22 on the assembly 10. The hooks 22 have been fitted over the top portion 24T of the rear wall 24R of the aquarium 24, thereby securing the assembly 10 to the aquarium 24. It is contemplated that the housing base 30B of the assembly 10 may also rest upon the same surface upon which the bottom surface 24B of the aquarium 24 rests, thereby relieving the rear wall 24R of the aquarium 24 from the full weight of the assembly 10.

Figure 5:
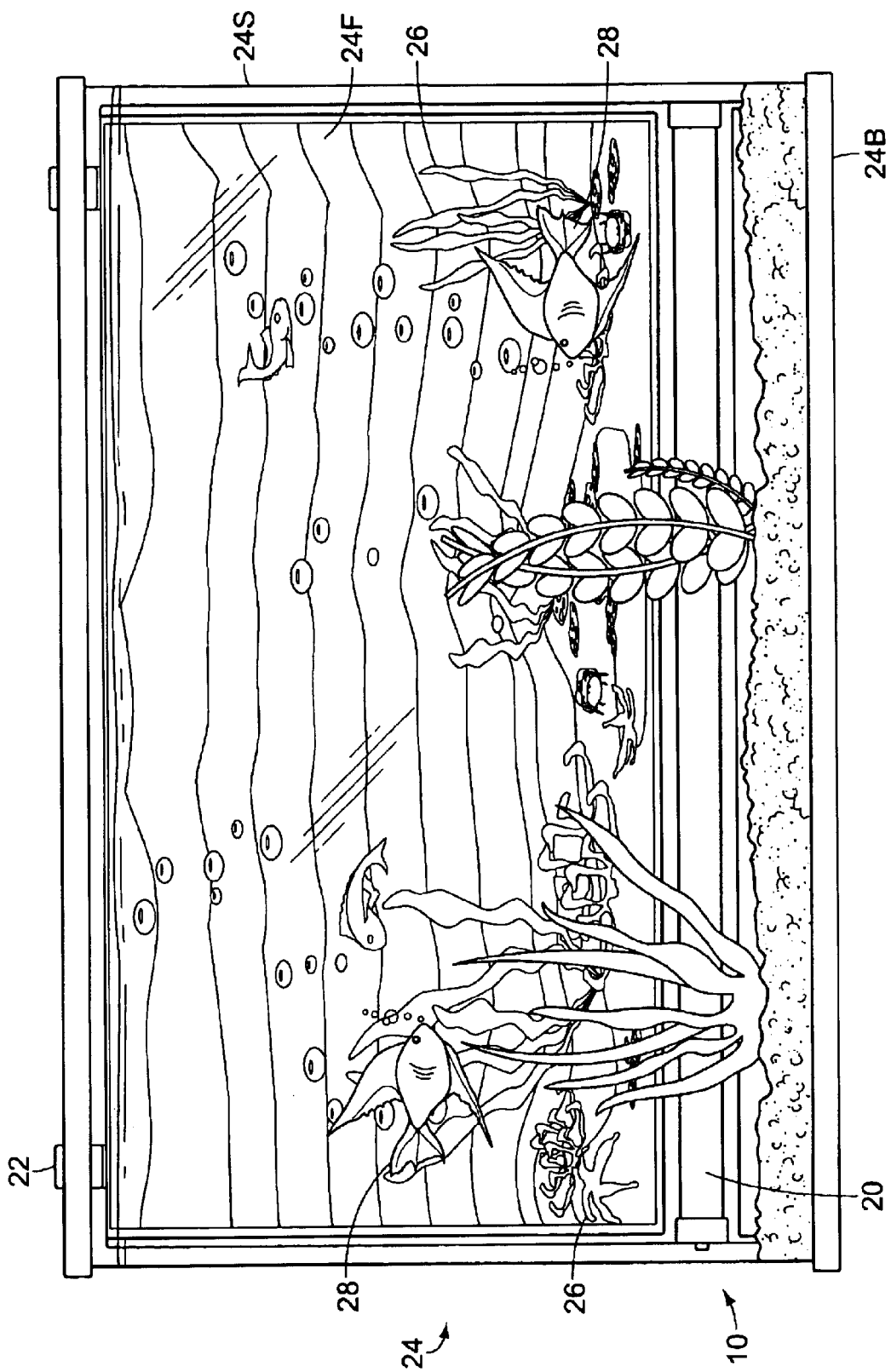
FIG. 5 is a front elevational view of the aquarium with the decorative background assembly positioned behind the rear wall of the aquarium.

FIG. 5 illustrates a front elevational view of the aquarium 24, after the decorative background assembly 10 has been selectively appended to the rear wall 24R of the aquarium 24. A viewer looking into the front wall 24F of the aquarium 24 is able to clearly see the fish 28 within the aquarium and is also able to see the background illustrations 26 which are behind the fish 28.

In use, a user chooses one of the plurality of the display panels 12 which are provided with the assembly 10, and inserts the panel 12 into the frame 14. The user positions the aquarium 24 at a location which provides an unobstructed view of the front wall 24F of the aquarium 24. The location should also have an unobstructed surface behind the rear wall 24R of the aquarium 24, for placement thereupon of the decorative background assembly 10. The location should also be in proximity to a power receptacle for illumination of the light bulb 20. The assembly 10 is then secured to the rear wall 24R of the aquarium 24 with the hooks 22 which are provided for this purpose. The user depresses the push-button switch 19 on the side of the fluorescent light fixture 18, thereby illuminating the front surface 12F of the display panel 12. The view through the transparent front wall 24F of the aquarium 24 is now greatly enhanced by the aesthetically pleasing background illustration 26 located upon the front surface 12F of the display panel 12.

In conclusion, herein is presented a decorative background assembly for an aquarium, having an illustrated display panel which may be selectively illuminated by a fluorescent light bulb, for enhancing the appearance of the aquarium. The invention is illustrated by example in the drawing figures, and throughout the written description. It should be understood that numerous variations are possible, while adhering to the inventive concept. Such variations are contemplated as being a part of the present invention.

What is claimed is:

1. A decorative background assembly, for use with an aquarium having a transparent front wall and a transparent rear wall, said decorative background assembly being selectively positioned behind the rear wall of the aquarium, comprising:

a display panel, having a front surface, a rear surface, an upper portion, and a lower portion, wherein the front surface is illustrated with an image, and is oriented so as to face the front wall of the aquarium, so that the image may be viewed through the transparent front wall and rear wall of the aquarium;

a fluorescent light fixture for holding a fluorescent light bulb, wherein said fixture is attached to said background assembly in proximity to the lower portion of the front surface of said display panel; and a mirror located in proximity to said fluorescent light bulb, said mirror positioned so as to reflect light from the light bulb onto the front surface of said display panel.

2. The decorative background assembly as recited in claim 1, further comprising a housing for containment therein of the fluorescent light fixture, the mirror, and the display panel, said housing having a transparent front surface, a rear surface, and a housing base, said front surface of said housing being substantially parallel to the display panel.

3. The decorative background assembly as recited in claim 2, wherein the mirror is positioned underneath the fluorescent light fixture, runs along substantially the entire length of the fluorescent light fixture, and forms an angle with the display panel, so that light from the fluorescent light bulb which shines upon the mirror is optimally reflected upon the display panel.

4. The decorative background assembly as recited in claim 3, further comprising a frame for selective containment therein of the display panel, said frame having at least one border into which the display panel may be selectively positioned.

5. The decorative background assembly as recited in claim 4, further comprising a plurality of display panels, each having an image on the front surface of the display panel, wherein the display panels may be interchanged, thereby providing a variety of images, each of said display panels capable of being selectively positioned within the frame.

6. The decorative background assembly as recited in claim 5, for use with an aquarium wherein the rear wall further has a top portion, said assembly further comprising a plurality of hooks attached in proximity to the upper portion of said housing, whereby said decorative background assembly may be selectively attached to the rear wall of said aquarium by engaging the hooks with the top portion of the rear wall of said aquarium.

7. A method of using a decorative background assembly by a user, in conjunction with an aquarium having a substantially transparent front surface and a substantially transparent rear surface, for enhancing the appearance of the aquarium, said background assembly having a display panel having a front surface, a rear surface, an upper portion, and a lower portion, wherein the front surface of the display panel is illustrated with an image, said background assembly further having a fluorescent light fixture for holding a fluorescent light bulb, wherein said fixture is attached to said background assembly in proximity to the lower portion of the front surface of said display panel, said background assembly additionally having a mirror in proximity to said fluorescent light bulb for reflection of light from the light bulb onto the front surface of said display panel, said decorative background assembly also having a housing having a transparent front surface, a rear surface, and a housing base, said housing being used to contain therein the fluorescent light fixture, the mirror, and the display panel, comprising the steps of:

a) positioning the aquarium by the user at a location which provides an unobstructed view of the front wall of the aquarium, said location having an unobstructed surface and space above said surface behind the rear wall of the aquarium, for placement on said surface of the decorative background assembly;

b) positioning the decorative background assembly by the user, behind the rear wall of the aquarium, with the front surface of the display panel facing forward, thereby allowing an unobstructed view of the display panel through the transparent front wall and the transparent rear wall of the aquarium;

c) illuminating the light bulb and thereby illuminating the front surface of the display panel; and d) viewing the aquarium by the user, with the illuminated display panel facing the viewer.

8. The method of using a decorative background assembly as recited in claim 7, wherein said assembly further comprises a plurality of display panels, and also a frame for selective insertion therein of one of said display panels, wherein the step of positioning the decorative background assembly behind the rear wall of the aquarium is preceded by the step of choosing by the user of one of the plurality of display panels, and by the step of inserting said display panel into the frame.

9. The method of using a decorative background assembly as recited in claim 8, wherein the assembly further comprises a plurality of hooks attached in proximity to the upper portion of said housing, wherein the step of positioning the decorative background assembly behind the rear wall of the aquarium is followed by the step of selectively attaching the assembly to the rear wall of said aquarium by engaging said hooks with the top portion of the rear wall of said aquarium.

* * * * *